Aug. 8, 1944.     H. TESTO     2,355,602
BAND-TOOL GUIDE
Filed Dec. 30, 1942

INVENTOR.
Henry Testo
BY
ATTORNEY

Patented Aug. 8, 1944

2,355,602

UNITED STATES PATENT OFFICE 2,355,602

BAND-TOOL GUIDE

Henry Testo, Cleveland, Ohio, assignor of one-half to Curt B. Muller, Cleveland, Ohio Original applications December 23, 1941, Serial No. 424,199, and March 28, 1942, Serial No. 436,680. Divided and this application December 30, 1942, Serial No. 470,550

3 Claims. (Cl. 29—76)

This invention pertains to a band-tool guide and more particularly to an appliance for delimiting the vibratory or whipping action of an endless band file and/or integrally combined band saw and band file.

The object has been to control, so as to make more effective and precise, the employment of a tool of either kind.

The subject matter of this divisional application comprises disclosures and claims taken from my two pending applications filed December 23, 1941, Serial No. 424,199 and filed March 28, 1942, Serial No. 436,680. For convenience, like numerals of reference have been retained.

Figure 1:
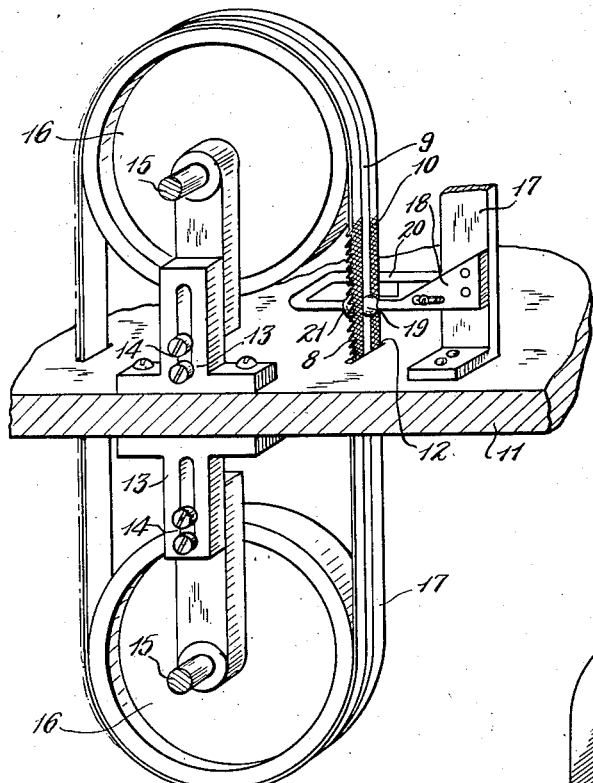
Fig. 1 is a perspective view, merely in outline, of an apertured machine-tool table and of a guiding appliance for the tool.
Figure 2:
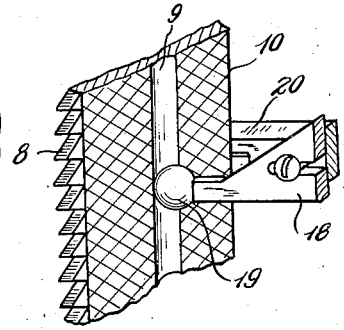
Fig. 2 is an enlarged view of the horizontally adjustable guiding mechanism.

A machine tool illustrated in Figure 1 as suitable for the operating performance of my invention, includes a table 11 intended to support the work piece or blank. The table is provided with a vertically extending slit 12 through which the sawing and filing unit is to travel. A pair of brackets 13, upstanding and depending respectively from the table, each has adjustable connection at 14 with an arm which carries near its free end a shaft 15 on which is mounted a pulley 16 having a yielding peripheral covering to prevent band slip parallel with the axes of the pulleys. The brackets 13 and their arms being duplicated are given the same reference numeral. My endless tool is shown enveloping both pulleys 16 so as to be driven thereby in a manner unnecessary to be shown because old practice. Adjacent to the slot 12, the table supports an upright standard 17 which carries a lateral extension 18 having its extremity spherically shaped at 19 so as to be adapted to occupy the traveling groove 9 whereby to guide that side of the band or to delimit its vibration, or flipping action in one direction transverse relative to the direction of band travel. The extension 18 is itself provided with a bowed extension 20 so that the two extensions, in conjunction with each other, approximate a C-shaped form. The extension 20 is horizontally adjustable (as indicated by the unnumbered set screws) and has its extremity fashioned as a contact finger 21—adapted oppositionally to guide or to delimit band action with reference to the approached slot 12, by its intermittent if not constant engagement with the opposite side of the band tool. Such guiding delimitation is required until a measure of sawing progress into the blank has occurred (somewhat prior to intersection of the roots of the teeth) after which such blank and tool intersection substitutionally serves the function of the initial fingerguiding. Manifestly, that side of the band which has the file ridges might less satisfactorily have the latter undivided by absence of the groove because abrasion of the guide finger and wear of the file ridges would result. As a sufficiently satisfactory modification, a flat surface might alternatively there divide the file ridges. Moreover, if the smooth longitudinally continuous groove 9 were in the opposite side of the band, the spherical end 19 should become transposed to the illustrated location of the contact finger 21. The provision of some adjustment for one or both guide fingers permits attainment of abrasion pressure of the file ridges to be exerted against an edge surface of a blank in the absence of a band-stabilizing confinement of the saw teeth and such pressure may be effected and maintained by means of the horizontal adjustment to any degree which experience shall have taught to be expedient, with consideration of the material of the blank, its thickness, the speed of the band, the delicacy of the filing "finish" to be imparted or the length of flexibility of the band.

For many jobs a small blank is satisfactorily to be guidably moved, turned and held against the two distinct sets of teeth, manually, whereby simultaneously to perform two different machining operations, as exemplified, first to commence to saw through the blank, progressively in one direction and then concurrently and progressively to abrade (file) along one of the consequent appositioned surfaces in a different direction and usually in an approximately transverse direction. However, for certain "quantity production" jobs, the relative movement sometimes required to effect pressure between the work and file band might be automatically accomplished and a relative movement in a plane intersected by the tool effected by spring pressure and be prescribed by some template actuator which is also adapted to maintain the required engaging pressure apart from a kerf, in substantially relatively transverse directions.

Figure 4:
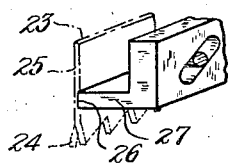
Fig. 4 is a perspective view of one of two cooperating guide elements with a contact finger terminous.

Provided are a pair of contact fingers of a guiding appliance and which comprises provision for both vertical adjustment as a unit and for adjustment of the two oppositioned guides toward and away from each other, as may be determined to be most suitable for the particular dimensions of the band about to be put to use. For my dual-machining band, the guides may be appropriately modified to L-shaped cross section as shown in Figure 4, or be otherwise designed so that the guide finger 27 on the file-surface side is somewhat restricted in a direction crosswise of the mounted band 23 or so as to be somewhat narrower and be adapted to come into engagement with only the intermediary longitudinally-extending strip portion (recessed or not) of the file-surface side of the band.

Figure 3:
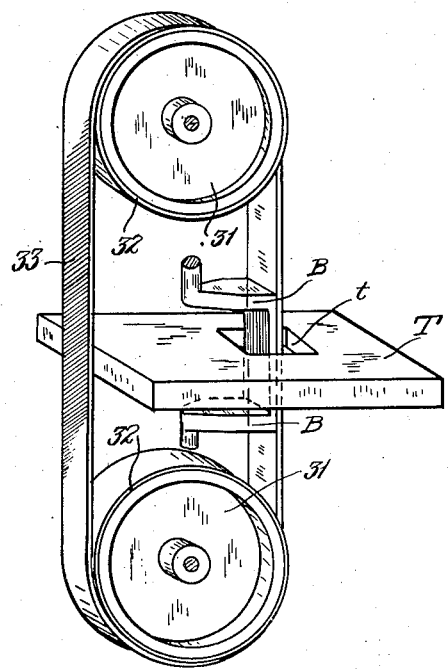
Fig. 3 is a perspective view of a pair of pulleys carrying a filing band, an apertured table and a modified form of a rigidly mounted backing member projected through said aperture.

The showing of Figure 3 is of a pair of wheels 31 which are covered with a yielding rubber or other, artificial yet equivalent material 32 so that the tension applied to the file band 33 will cause it to become slightly imbedded in said cover to prevent lateral slip. Though it is old practice in the art to employ a table through which one vertical (downwardly traveling) section of a band saw is moved, I believe that I am the first successfully to make and similarly to mount an endless, flexible band integrally provided with linear file teeth extending crosswise of the band and hardened (for use on metal) to over sixty on the Rockwell scale C. I have therefore additionally illustrated in Figure 3 the work-supporting table T and its aperture t.

When employing a file band from which saw teeth have been omitted, it will be advantageous to supply a backing for inside and/or plan side of the traveling band because the additional guidance, furnished by the appositioned walls of the kerf during sawing, is missing. Such a backing should be firm and I have shown rigidity attained by having the backing structure B projected through the aperture t and secured above the table to any fixture and below the table to a unit thereof. On some machines a single connection above the table for a depending backing or a single connection below the table for an upstanding backing might be adequately firm and should be feasible. Important it is that the firm backing surface proper be of about the same width as the band and at least at though preferably intersecting the plane of, the table top where some pressure contact, for instance, between an edge surface of a die and the file teeth, should be maintained. I have shown the backing structure projected through the aperture t so that, when engaged on internal filling work, any required movement of the workpiece around the center of the aperture t will not be obstructed or even restricted by its contact with any attachment to the top of the table T.

I would have it understood that my invention comprehends modified constructions and equivalent methods within the scope of the granted claims. The showing of the drawing and the specific descriptions thereof are merely exemplifications of a plurality of mechanical embodiments and arrangements and procedures.

I claim:

1. In combination, a support including a table provided with an aperture, wheels operatively mounted on said support above and below said table respectively, an endless and flexible band integrally fashioned along a portion of one side with file teeth, said band being mounted to travel around said wheels and through said aperture and a backing element carried adjacent to the path of travel of the file-surface side of said band, in contactual apposition to the plain area of the file-surface side of said band and in proximity to the plane of the upper margin of said aperture.

2. The combination of an apertured table, an endless, flexible band provided longitudinally along a portion of one side with integral file teeth to leave a continuous, longitudinal smooth area adjacent to said teeth, said band being adapted to travel through said aperture and a band-backing appliance located adjacent to the path of travel of said band, said appliance including a backing surface arranged to contact only the smooth area on the file-surface side of said band.

3. In combination, a support including a table provided with an aperture, wheels operatively mounted on said support above and below said table respectively, an endless and flexible band integrally fashioned along a side with crosswise-separated file teeth and with a continuous longitudinal smooth area therebetween, said band being mounted to travel around said wheels and through said aperture and a pair of backing elements carried adjacent to the paths of travel of the smooth areas on opposite sides of said band respectively.

HENRY TESTO.